(12) United States Patent
Isono (10) Patent No.: US 8,209,067 B2
(45) Date of Patent: Jun. 26, 2012

(54) HEIGHT CONTROL DEVICE FOR VEHICLE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 808 days.

(21) Appl. No.: 12/303,432

(22) PCT Filed: Aug. 10, 2007

(86) PCT No.: PCT/JP2007/065981
§ 371 (c)(1),
(2), (4) Date: Dec. 4, 2008

(87) PCT Pub. No.: WO2008/018636
PCT Pub. Date: Feb. 14, 2008

(65) Prior Publication Data
US 2009/0198405 A1  Aug. 6, 2009

(30) Foreign Application Priority Data
Aug. 10, 2006  (JP) .................... P2006-218646

(51) Int. Cl.
G05D 1/00 (2006.01)
G05D 3/00 (2006.01)
(52) U.S. Cl. ............................... 701/4; 180/23
(58) Field of Classification Search .............. 701/29, 701/35, 48–9, 4; 207/232, 256.1, 181, 217.3; 180/23
See application file for complete search history.

(56) References Cited

U.S. PATENT DOCUMENTS

| 5,822,707 | A  | * | 10/1998 | Breed et al. ............... 701/49 |
| 2006/0152052 | A1 | * | 7/2006 | Billger et al. ............. 297/285 |
| 2006/0237242 | A1 | * | 10/2006 | Burke ........................ 180/23 |
| 2008/0091322 | A1 | * | 4/2008 | Phipps et al. ............. 701/48 |
| 2009/0005938 | A1 | * | 1/2009 | Phipps et al. ............. 701/49 |

FOREIGN PATENT DOCUMENTS

| JP | 5 58238 | 3/1993 |
| JP | 5 85235 | 4/1993 |
| JP | 9 76799 | 3/1997 |

(Continued)

OTHER PUBLICATIONS

A simple controller of minisize quad-rotor vehicle; Hongning Hou; Jian Zhuang; Hu Xia; Guanwei Wang; Dehong Yu; Mechatronics and Automation (ICMA), 2010 International Conference on; Digital Object Identifier: 10.1109/ICMA.2010.5588802 Publication Year: 2010 , pp. 1701-1706.*

(Continued)

Primary Examiner — Cuong H Nguyen
(74) Attorney, Agent, or Firm — Oblon, Spivak, McClelland, Maier & Neustadt, L.L.P.

(57) ABSTRACT

A seat height control amount setting part determines a target seat height displacement amount according to a deceleration outputted from a braking state calculating part. The deceleration is corrected according to the vehicle speed of a vehicle, and the target seat displacement amount is set such that the seat height becomes lower as the vehicle speed is higher. While correcting the target seat height displacement amount, a target deceleration with respect to the amount of operation of a brake pedal is corrected. The target deceleration is corrected such that the target deceleration with respect to the amount of operation of the brake pedal becomes greater as the vehicle speed is higher.

6 Claims, 9 Drawing Sheets

FOREIGN PATENT DOCUMENTS

JP    2006 123626    5/2006
JP    2007 176425    7/2007

OTHER PUBLICATIONS

Development of a vehicle height sensor for active suspension; Kwangsuck Boo; Jaewoo Park; Dongrak Lee; Bonggun Cho; Sooman Son; Control, Automation and Systems, 2007. ICCAS '07. International Conference on; Digital Object Identifier: 10.1109/ICCAS.2007.4406922; Publication Year: 2007, pp. 278-282.*

Study of fuzzy controller to control vertical position of an air-cushion tracked vehicle; Hossain, A.; Rahman, A.; Mohiuddin, A.K.M.; Mechatronics (ICOM), 2011 4th International Conference On; Digital Object Identifier: 10.1109/ICOM.2011.5937173 Publication Year: 2011, pp. 1-6.*

Height sensor fault diagnosis for electronic air suspension (EAS) system; Donggil Ha; Hyunsup Kim; Hyeongcheol Lee; Industrial Electronics, 2009. ISIE 2009. IEEE International Symposium on; Digital Object Identifier: 10.1109/ISIE.2009.5218133 Publication Year: 2009, pp. 211-216.*

* cited by examiner

HEIGHT CONTROL DEVICE FOR VEHICLE

TECHNICAL FIELD

The present invention relates to a vehicle altitude control apparatus for controlling an altitude of a driver in a vehicle with respect to a road surface.

BACKGROUND ART

Techniques have been known for changing the position and altitude of the seat surface and the like of a driver's seat in a vehicle according to the body shape and likings of the driver. They aim at improving the driver's feel of seating by utilizing such a driver's seat. On the other hand, as performances of vehicles have been improving, high-speed running and operating characteristics have been made better than those conventionally attained. As a result, the acceleration, deceleration, rolling force, and the like acting on passengers have been becoming greater than conventional ones. As the speed and posture of the vehicle change, the inertial force acting on the passengers may alter the state of seating of the passengers, so as to cause a sense of discomfort in the feel of seating, thereby making the passengers feel uncomfortable.

Known as a technique for restraining the seating state from changing according to such a vehicle behavior is one disclosed in Japanese Patent Application Laid-Open No. 5-85235. This technique detects the amount of displacement of the posture of a vehicle and displaces the posture of a seat in response thereto, so as to compensate for the inertial force occurring in the passengers, thereby reducing or eliminating the sense of discomfort in the passengers.

DISCLOSURE OF THE INVENTION

Meanwhile, when the seating state of the driver changes during driving, the positional relationship between an operating device such as steering wheel or pedal and the driver changes, so as to alter its operability, which also makes the driver feel a sense of discomfort. The change in the feel of seating may cause a difference between the acceleration/deceleration or state of turning felt by the driver and the acceleration/deceleration or state of turning acting on the driver in practice, thereby yielding a deviation between the vehicle behavior intended by the driver and the realized vehicle behavior.

To cope with this problem, the seat surface of the driving seat may be displaced downward at an early stage of deceleration when the vehicle is decelerated, for example. At the early stage of deceleration, the center of gravity of the vehicle ascends, so as to increase the seat reaction force, thereby enhancing the deceleration felt by the driver. This may cause a possibility of falsely recognizing that the braking force is greater than the actual one, whereby the braking force may be fed insufficiently. Therefore, the seat is displaced downward at the early stage of deceleration, so as to restrain the seat surface from moving up even when the center of gravity of the vehicle ascends, thereby suppressing the increase in the seat reaction force. As a result, the driver can feel a deceleration similar to that acting on the vehicle.

Even when the seat surface of the driver's seat is thus displaced downward at the early stage of deceleration, so as to lower the altitude of the driver with respect to the road surface, however, it is desirable to yield a more stable feel of deceleration.

It is therefore an object of the present invention to provide a vehicle altitude control apparatus which can provide the driver with a natural feel of deceleration at the time of decelerating the vehicle by adjusting the altitude of the driver with respect to the road surface.

The vehicle altitude control apparatus in accordance with the present invention overcoming the problem mentioned above comprises braking state detecting means for detecting a braking state of a vehicle, target altitude setting means for setting a target altitude of a driver with respect to a road surface according to the braking state detected by the braking state detecting means, altitude adjusting means for adjusting an altitude of the driver according to the target altitude set by the target altitude setting means, and vehicle speed detecting means for detecting a vehicle speed of the vehicle; wherein the target altitude setting means corrects the target altitude according to the vehicle speed detected by the vehicle speed detecting means.

While changing depending on the altitude of the vehicle, such as to become stronger as the altitude is higher, the feel of deceleration sensed by the driver has further been found to be affected not only by the altitude of the vehicle but also by the vehicle speed. Specifically, it has been found that the feel of deceleration becomes greater than the actual deceleration as the vehicle speed is higher. Based on such a finding, the vehicle altitude control apparatus in accordance with the present invention detects the vehicle speed and corrects the altitude of the driver with respect to the road surface according to the detected vehicle speed. This can provide the driver with a natural feel of deceleration.

Here, the target altitude setting means may be configured such as to correct the target altitude so that the amount of downward displacement of the target altitude becomes greater as the vehicle speed detected by the vehicle speed detecting means is higher.

When the target altitude is thus corrected so that the amount of downward displacement of the target altitude becomes greater as the vehicle speed is higher, the moving direction of the driver is hard to fluctuate between low and high speeds, whereby a stable feel of deceleration can be obtained. The moving direction of the driver herein refers to the direction of a vector obtained when the moving direction vector of the altitude adjusting means and the velocity vector of the vehicle are combined. As the vehicle speed, either the vehicle speed at the time of starting the braking or the vehicle speed during when the braking is continued can be used.

The vehicle altitude control apparatus may further comprise braking means for braking the vehicle and braking control means for controlling the braking means, wherein the braking control means sets a greater amount of braking in the braking means as the vehicle speed detected by the vehicle speed detecting means is higher.

When controlling the target altitude such as to make it lower as the vehicle speed is higher, the feel of deceleration is harder to obtain as the target altitude is lower, whereby the driver is harder to attain the feel of deceleration as the running speed is higher. This may cause a possibility of lowering the feel of deceleration with respect to a decelerating action as the vehicle runs faster, thereby making the driver feel a stronger sense of stroke. Therefore, when the amount of braking in the braking means is set greater as the vehicle speed detected by the vehicle speed detecting means is higher, the driver can be provided with a feel of deceleration proportional to the braking force.

The vehicle altitude control apparatus may further comprise brake operating means for operating the braking means, braking operation amount detecting means for detecting an amount of braking operation of the brake operating means, and acceleration detecting means for detecting an acceleration of the vehicle; wherein the braking state detecting means detects the braking state of the vehicle according to the amount of braking operation of the brake operating means detected by the braking operation amount detecting means and the acceleration of the vehicle detected by the acceleration detecting means; and wherein the target altitude setting means keeps a constant relationship between the altitude and the amount of operation of the brake operating means and determines a ratio of the altitude set with respect to the acceleration of the vehicle according to the vehicle speed detected by the vehicle speed detecting means.

When the ratio of altitude set with respect to the acceleration of the vehicle is thus determined according to the vehicle speed detected by the vehicle speed detecting means while the relationship between the altitude and the amount of operation of the brake operating means is held constant, the senses of difference between the braking force generated with respect to the amount of braking operation and the altitude of the driver can be reduced. This can lower the sense of discomfort with respect to the amount of braking operation given to the driver.

The vehicle altitude control apparatus may be configured such that the target altitude is determined according to a seat height of a driver's seat in the vehicle, the target altitude setting means is seat height setting means for setting the seat height, and the altitude adjusting means is seat height adjusting means for adjusting the seat height. The vehicle altitude control apparatus may also be configured such that the target altitude is determined according to a vehicle height of the vehicle, the target altitude setting means is vehicle height setting means for setting the vehicle height of the vehicle, and the altitude adjusting means is vehicle height adjusting means for adjusting the vehicle height of the vehicle.

Thus, the target altitude can be determined according to the seat height of the driver's seat or the vehicle height of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODES FOR CARRYING OUT THE INVENTION

In the following, embodiments of the vehicle altitude control apparatus in accordance with the present invention will be explained with reference to the drawings. Explanations of the same members and constituents may be omitted.

Figure 1:
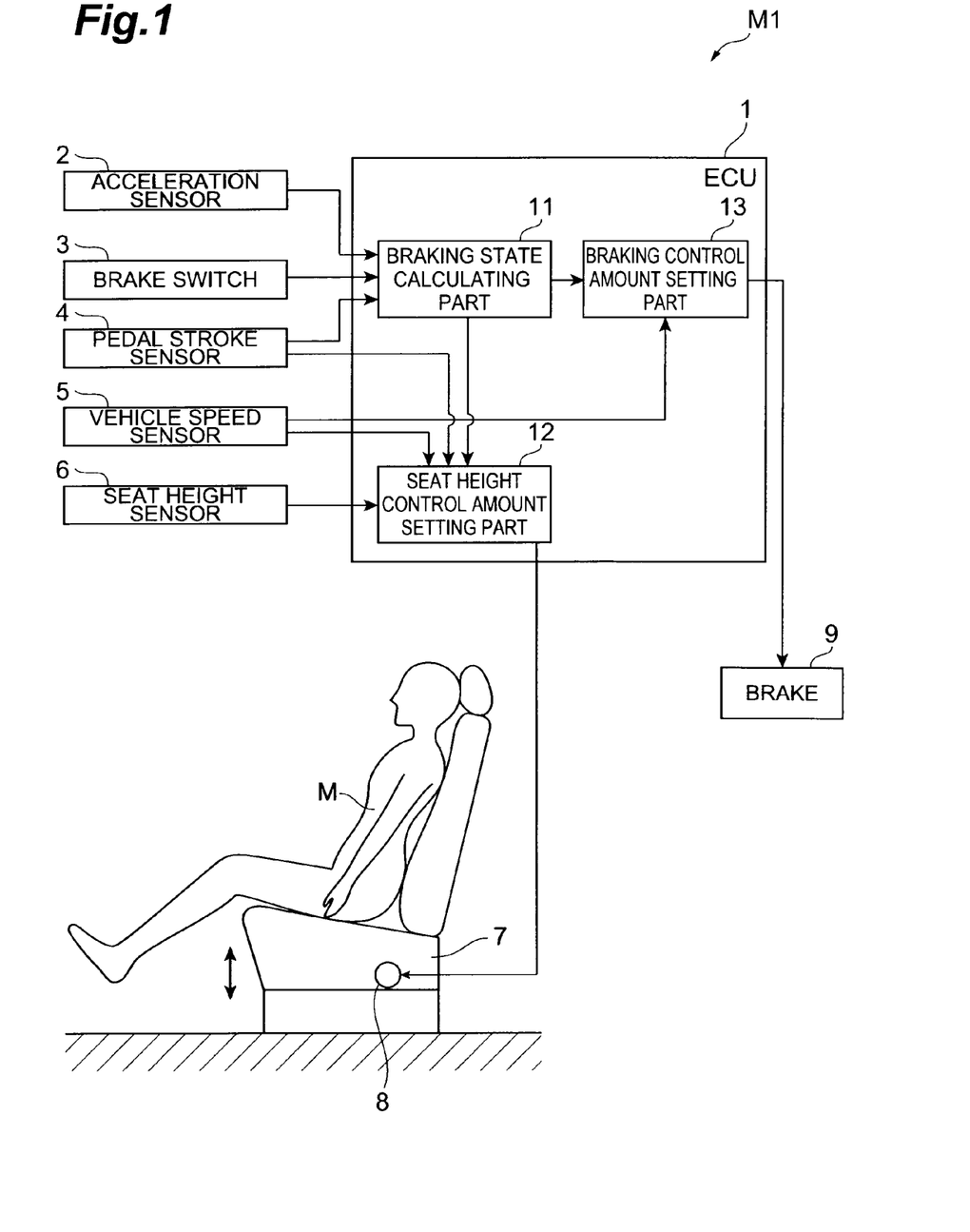
FIG. 1 is a block diagram showing the structure of a seat height control apparatus.
Figure 2:
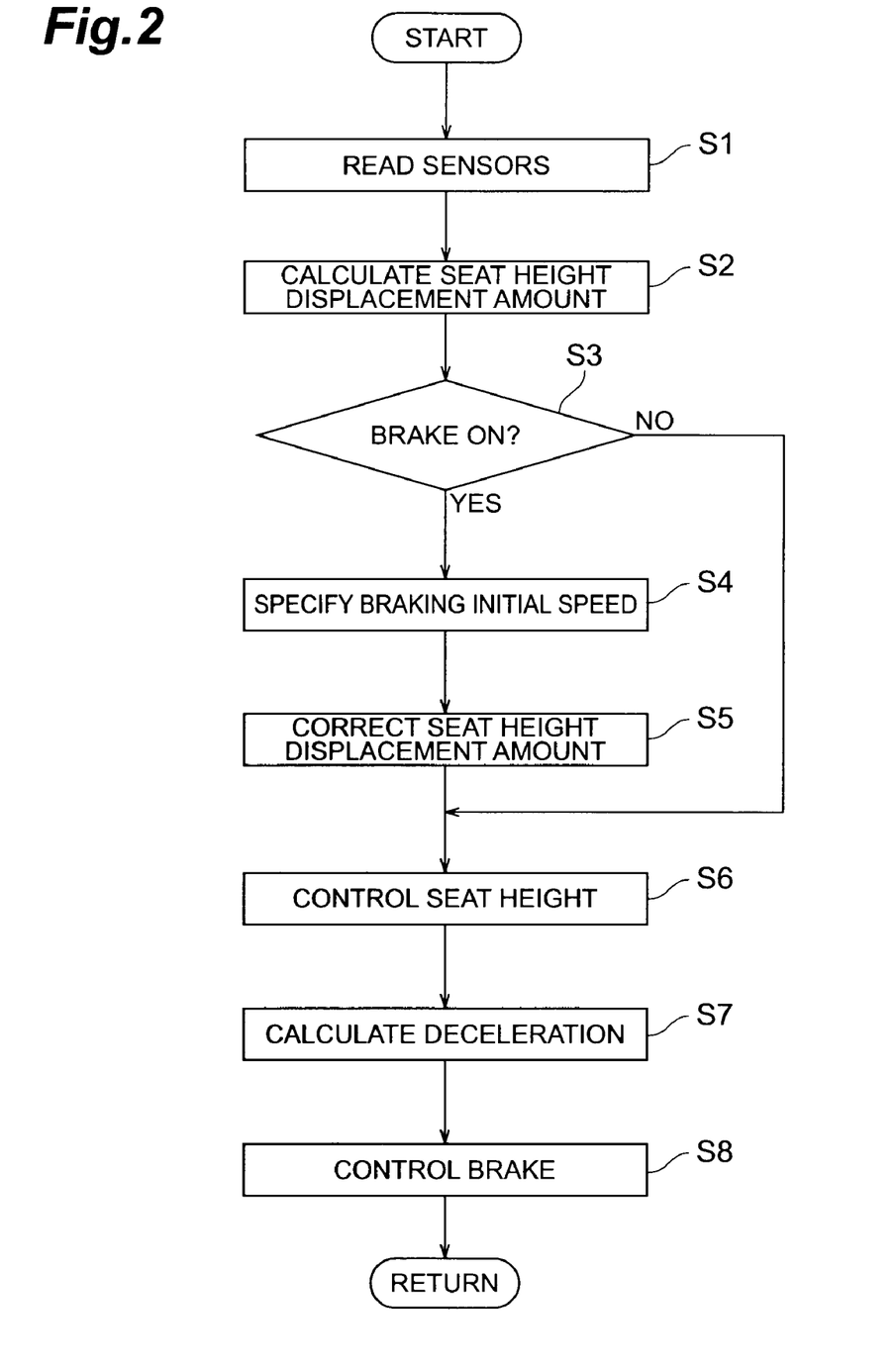
FIG. 2 is a flowchart showing a controlling procedure in the seat height control apparatus.

FIG. 1 is a block diagram showing the structure of a seat height control apparatus as the vehicle altitude control apparatus in accordance with an embodiment of the present invention, while FIG. 2 is a flowchart showing a controlling procedure in the seat height control apparatus in accordance with this embodiment. This embodiment adjusts the altitude of a driver with respect to the road surface by the seat height control in a driver's seat.

As shown in FIG. 1, the seat height control apparatus in accordance with this embodiment is provided in a vehicle M1 and includes an electronic control unit (hereinafter referred to as "ECU") 1. The ECU 1 comprises a braking state calculating part 11, a seat height control amount setting part 12 which is a target altitude setting means, and a braking control amount setting part 13 which is a braking control means. An acceleration sensor 2, a brake switch 3, a pedal stroke sensor 4 which is a braking operation amount detecting means, a vehicle speed sensor 5 which is a vehicle speed detecting means, and a seat height sensor 6 are connected to the ECU 1.

The vehicle M1 is provided with a driver's seat 7. The driver's seat 7 comprises a seating member on which the driver sits and a backrest member erected on the flat surface side thereof. The seating member of the driver's seat 7 is provided with a seat height adjusting mechanism 8. The seat height adjusting mechanism 8 is connected to the seat height control amount setting part 12 in the ECU 1 and adjusts the height of the seating surface, which is the seat height of the driver's seat, according to an output value from the seat height control amount setting part 12.

The acceleration sensor 2 is attached to the center part of the vehicle M1, for example, and detects the acceleration (deceleration) of the vehicle M1. The acceleration sensor 2 outputs the detected acceleration to the braking state calculating part 11 in the ECU 1.

The brake switch 3 is attached to a brake pedal which is a brake operating means in a vehicle compartment, for example, and detects an operating state (ON/OFF) of the brake pedal. When the brake pedal is operated, the brake switch 3 outputs a brake ON signal to the braking state calculating part 11 in the ECU 1.

The pedal stroke sensor 4 is attached to the brake pedal provided in the vehicle compartment and detects the amount of operation of the brake pedal. The pedal stroke sensor 4 outputs the detected amount of operation of the brake pedal to the braking state calculating part 11 in the ECU 1.

The vehicle speed sensor 5 is attached to a wheel, for example, and detects the vehicle speed by sensing the wheel speed. The vehicle speed sensor 5 outputs the detected vehicle speed to the seat height control amount setting part 12 and braking control amount setting part 13 in the ECU 1.

The seat height sensor 6 is provided in the seating member in the driver's seat 7 and detects the seat height that is the height position of the seat surface in the driver's seat. The seat height sensor 6 outputs the detected seat height to the seat height control amount setting part 12 in the ECU 1.

The braking state calculating part 11 in the ECU 1 determines whether there is a braking operation or not, the amount of braking, and the amount of braking operation as braking states of the vehicle. According to the brake ON signal outputted from the brake switch 3, the braking state calculating part 11 detects the ON/OFF of the brake. Whether there is a braking operation or not is determined by whether the brake ON signal is outputted or not. Upon receiving the brake ON signal, the braking state calculating part 11 outputs the brake ON signal to the seat height control amount setting part 12 and braking control amount setting part 13.

The braking state calculating part 11 also determines the deceleration of the vehicle according to the acceleration of the vehicle M1 outputted from the acceleration sensor 2. When the acceleration of the vehicle M1 outputted from the acceleration sensor 2 is negative, the braking state calculating part 11 outputs the resulting deceleration to the seat height control amount setting part 12 and braking control amount setting part 13. The braking state calculating part 11 further determines the amount of braking operation according to the amount of operation of the brake pedal outputted from the pedal stroke sensor 4. The braking state calculating part 11 outputs the determined amount of braking operation to the seat height control amount setting part 12 and braking control amount setting part 13.

Figure 3:
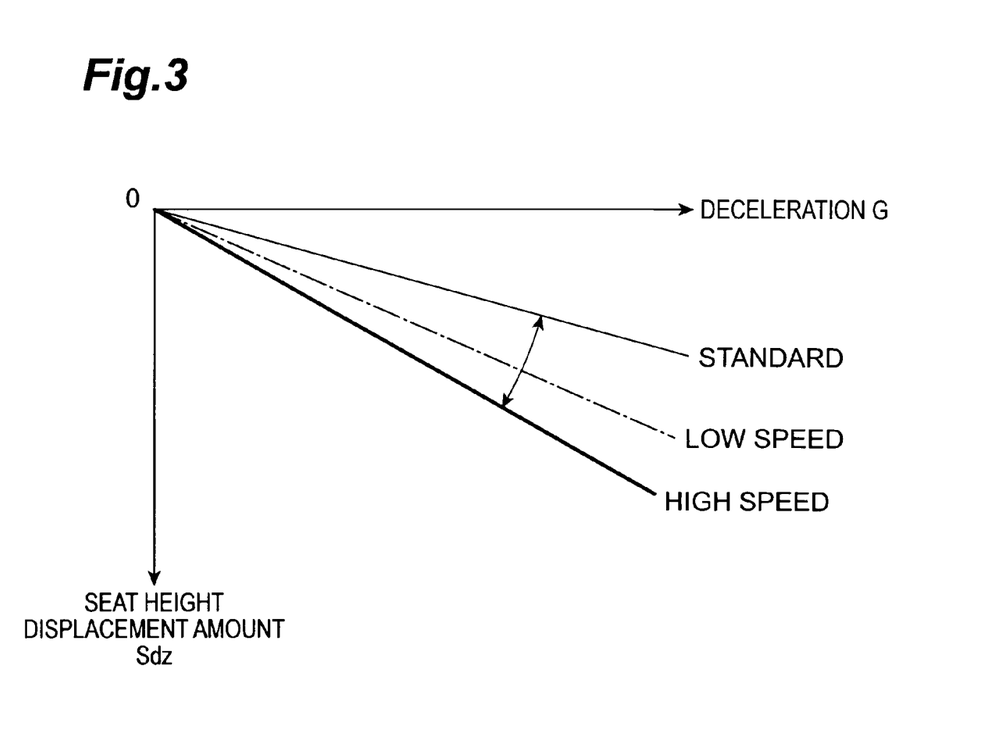
FIG. 3 is a map showing relationships between the deceleration and the target seat height displacement amount.
Figure 4:
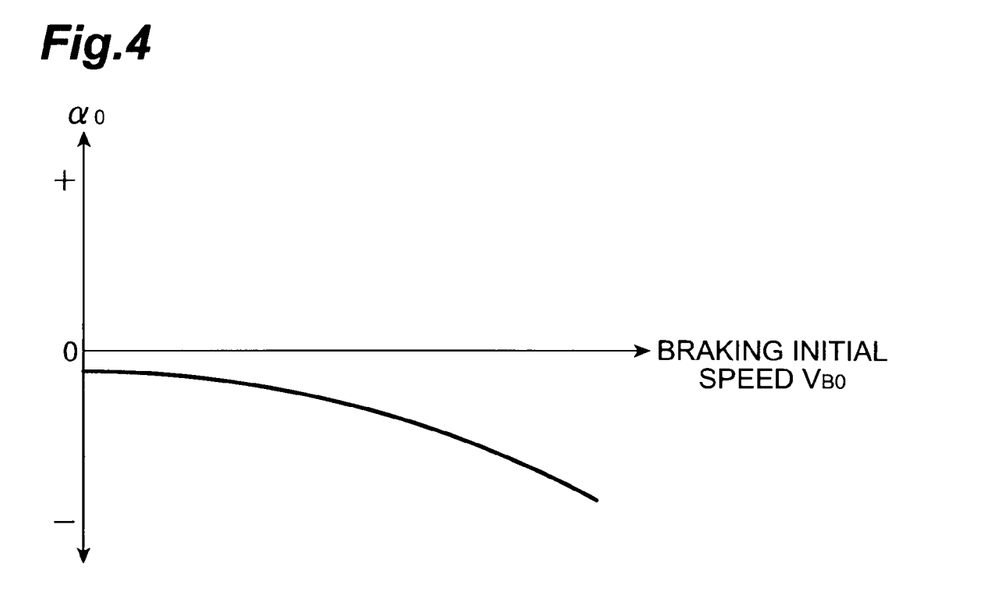
FIG. 4 is a map showing the relationship between the braking initial speed and the target seat height displacement amount correction coefficient.

The seat height control amount setting part 12 stores the map shown in FIG. 3 indicating the relationships between the deceleration and the target seat height displacement amount and the map shown in FIG. 4 indicating the relationship between the braking initial speed and the target seat height displacement amount correction coefficient. The seat height control amount setting part 12 refers to the map shown in FIG. 3 for the deceleration outputted from the braking state calculating part 11, and computes an uncorrected target seat height displacement amount according to the uncontrolled seat height of the driver's seat outputted from the seat height sensor 6.

The seat height control amount setting part 12 also refers to the map shown in FIG. 4 for the vehicle speed outputted from the vehicle speed sensor 5 when the brake ON signal is outputted from the braking state calculating part 11, and computes a target seat height displacement amount correction coefficient. The target seat height displacement amount correction coefficient herein is determined according to the braking initial speed that is the initial speed at the instant when the braking state is started. In the map shown in FIG. 4, the target seat height displacement amount correction coefficient becomes smaller as the braking initial speed is higher. When this map is used, the downward target seat height displacement amount is corrected so as to become greater as the braking initial speed is higher. According to the uncorrected target seat height displacement amount computed by using FIG. 3 and the target seat height displacement amount computed by referring to the map shown in FIG. 4, the seat height control amount setting part 12 determines a target seat height displacement amount. The seat height adjusting mechanism 8 is controlled according to the target seat height displacement amount.

Figure 5:
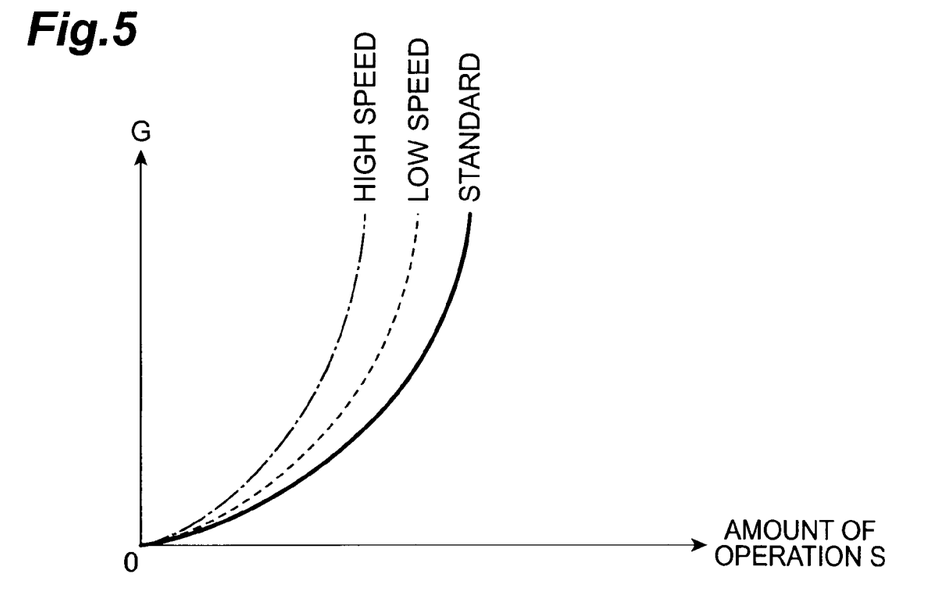
FIG. 5 is a map showing relationships between the amount of operation of a brake pedal and the deceleration.

The braking control amount setting part 13 stores the map shown in FIG. 5 indicating relationships between the amount of operation of the brake pedal and the deceleration. It also stores the map shown in FIG. 6 indicating the relationship between the vehicle speed and the braking control amount correction coefficient. The braking control amount setting part 13 refers to the map shown in FIG. 5 for the amount of operation of the brake pedal outputted from the braking state calculating part 11, and computes a target braking control amount according to the current deceleration outputted from the braking state calculating part 11. The braking control amount setting part 13 also refers to the map shown in FIG. 6 for the vehicle speed outputted from the vehicle speed sensor 5 as the braking initial speed when the brake ON signal is outputted from the braking state calculating part 11, and determines a target braking control amount correction coefficient for correcting the braking control amount. In the map shown in FIG. 6, the target braking control amount correction coefficient becomes greater as the braking initial speed is higher. When this map is used, the target braking control amount for the amount of operation of the brake pedal is corrected such as to become greater as the braking initial speed is higher. The braking control amount setting part 13 corrects the braking control amount by using a target braking control amount correction coefficient a, so as to determine a corrected braking control amount, and drives the brake 9 according to the corrected braking control amount.

A controlling procedure in the seat height control apparatus in accordance with this embodiment will now be explained with reference to FIG. 2. First, as shown in FIG. 2, the seat height control apparatus in accordance with this embodiment reads the respective values outputted to the ECU 1 from the acceleration sensor 2, brake switch 3, pedal stroke sensor 4, vehicle speed sensor 5, and seat height sensor 6 after being detected thereby (S1). According to the values outputted from the sensors, the braking state calculating part 11 determines whether there is a braking operation or not, the deceleration, and the amount of operation of the brake pedal. When there is a braking operation, a brake ON signal is outputted to the seat height control amount setting part 12 and braking control amount setting part 13. Also, the deceleration and the amount of operation of the brake pedal are outputted to the seat height control amount setting part 12 and braking control amount setting part 13.

The seat height control amount setting part 12 refers to the line indicating "standard" in the map shown in FIG. 3 for the deceleration of the vehicle M1 outputted from the braking state calculating part 11, and computes an uncorrected target seat height displacement amount Sdzq (S2) by the following expression (1) according to the seat height of the driver's seat 7 outputted from the seat height sensor 6.

$$Sdzq = G^x \qquad (1)$$

where G is the deceleration.

The constant x is 1 in the graph shown in FIG. 3 but may be any number. After computing the uncorrected target height displacement amount Sdzq, whether a brake ON signal is outputted from the braking state calculating part 11 or not is determined (S3). When the result indicates that the brake ON signal is outputted, a braking initial speed is specified (S4). In the seat height control amount setting part 12, the vehicle speed of the vehicle M1 outputted from the vehicle speed sensor 5 when the brake ON signal is outputted is taken as a braking initial speed $V_{BO}$.

After specifying the braking initial speed $V_{BO}$, the target seat height displacement amount is corrected (S5). When correcting the target seat height displacement amount, a target seat height displacement amount correction coefficient α is initially determined. As the target seat height displacement amount correction coefficient α, a target seat height displacement amount correction coefficient $\alpha_0$ corresponding to the braking initial speed is used here. To this aim, referring to the map shown in FIG. 4 for the braking initial speed $V_{BO}$ determined by step S4, the target seat height displacement amount correction coefficient $\alpha_0$ corresponding to the braking initial speed $V_{BO}$ is determined according to the following expression (2). In the map shown in FIG. 4, the absolute value of the target seat height displacement amount correction coefficient $\alpha_0$ becomes greater as the braking initial speed is higher.

$$\alpha_0 = F_1(V_{BO}). \quad (2)$$

After thus determining the target seat height displacement amount correction coefficient $\alpha_0$, the uncorrected target seat height displacement amount Sdzq is corrected according to the following expression (3), so as to determine a target seat height displacement amount Sdz.

$$Sdz = \alpha_0 G^x. \quad (3)$$

After determining the target seat height displacement amount Sdz that has corrected the uncorrected target seat height displacement amount Sdzq, the seat height adjusting mechanism 8 is controlled such as to achieve the target seat height displacement amount Sdz (S6). For example, it is controlled such that the seating surface of the driver's seat is moved down in response to the target seat height displacement amount Sdz greatly and slightly when the target seat height displacement amount Sdz is large and small, respectively.

When it is determined in step S3 that the brake ON signal is not outputted to the seat height control amount setting part 12, the uncorrected target seat height displacement amount Sdzq is directly employed as the target seat height displacement amount Sdz without correcting the uncorrected target seat height displacement amount Sdzq or by setting the target seat height displacement amount correction coefficient $\alpha$ to 1. Thereafter, the seat height adjusting mechanism 8 is controlled such as to attain the target seat height displacement amount Sdz (S6).

After controlling the seat height adjusting mechanism 8, the braking control amount setting part 13 computes a target deceleration (S7). The braking control amount setting part 13 refers to the line indicating "standard" in the map shown in FIG. 5 for the deceleration of the vehicle M1 and the amount of operation of the brake pedal that are outputted from the braking state calculating part 11, and determines an uncorrected target deceleration Gq according to the following expression (4):

$$Gq = S^b \quad (4)$$

where S is the amount of operation of the brake pedal, and b is a constant.

Figure 6:
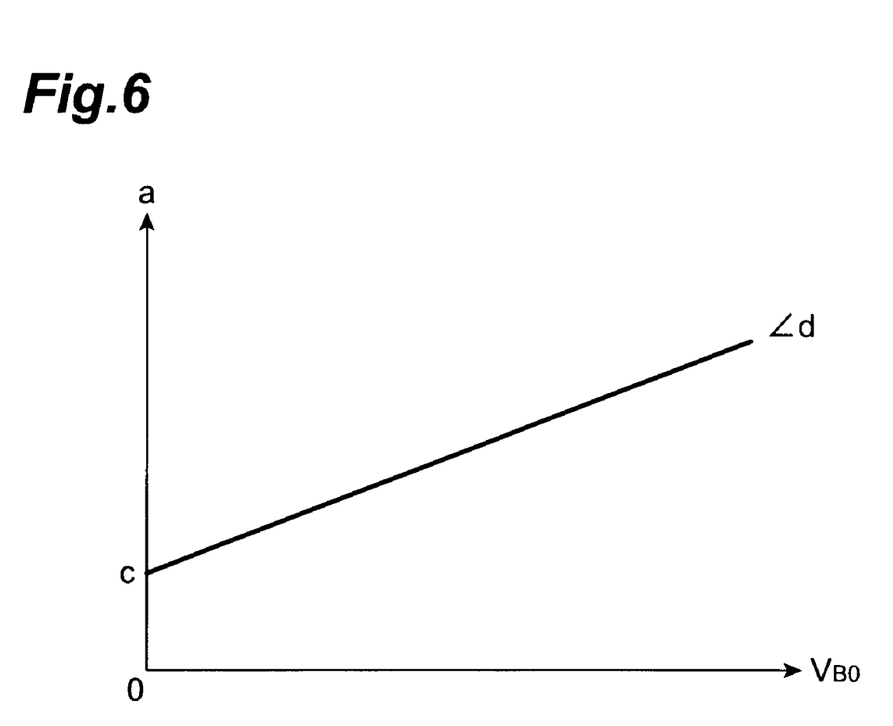
FIG. 6 is a map showing the relationship between the vehicle speed and the braking control amount correction coefficient.

With respect to this uncorrected target deceleration Gq, referring to the map shown in FIG. 6 for the vehicle speed of the vehicle M1 outputted from the vehicle sensor 5 when the brake ON signal is outputted from the braking state calculating part 11, the target braking control amount correction coefficient a is determined by the following expression (5):

$$a = dV_{BO} + c \quad (5)$$

where c and d are constants.

After determining the target braking control amount correction coefficient a, the uncorrected target deceleration Gq is corrected according to the following expression (6), so as to determine a target deceleration G. In the map shown in FIG. 6, the target braking control amount correction coefficient a increases as the amount of operation of the brake pedal is greater. After correcting the target braking control amount, the line indicating "standard" shown in FIG. 5 shifts to a line indicating "low speed" or "high speed".

$$G = aS^b. \quad (6)$$

After determining the target deceleration G, the brake 9 is controlled such as to attain the target deceleration G (S8). The control in the suspension control apparatus is thus terminated.

In the seat height control apparatus in accordance with this embodiment, the seat height control amount setting part 12 thus corrects the target seat height displacement amount by referring to the vehicle speed of the vehicle M1 when setting the target sheet height displacement amount. This can provide the driver with a natural feel of deceleration when the vehicle M1 is decelerated.

When correcting the target seat height displacement amount, it is corrected such as to become greater as the vehicle speed is higher. This makes it harder for the moving direction of the driver to fluctuate between low and high speeds, whereby a stable feel of deceleration can be obtained.

Further, the braking control amount setting part 13 corrects the braking control amount according to the vehicle speed outputted from the vehicle speed sensor 5, such that the amount of braking (deceleration) of the brake 9 with respect to the amount of operation of the brake pedal is set greater as the vehicle speed is higher. When controlling the target seat height displacement amount such as to make it greater as the vehicle speed is higher, the feel of deceleration is harder to attain as the target seat height displacement amount is greater, whereby the driver is harder to obtain the feel of deceleration as the running speed is higher. When the amount of braking of the brake 9 with respect to the amount of operation of the brake pedal is set greater as the vehicle speed is higher, in contrast, the driver can be provided with a feel of deceleration proportional to a decelerating action.

Figure 7:
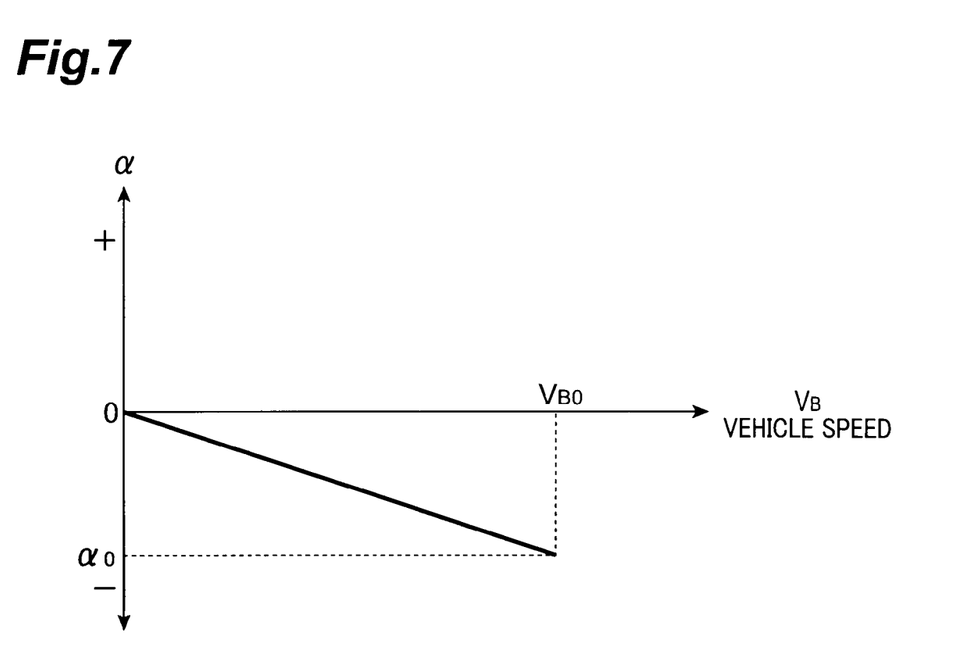
FIG. 7 is a map showing the relationship between the vehicle speed and the target seat height displacement amount correction coefficient.

Though the above-mentioned embodiment refers to the map shown in FIG. 4 while using the braking initial speed as the vehicle speed when determining the target seat height displacement amount correction coefficient, the target seat height displacement amount correction coefficient may be determined in response to each vehicle speed detected during a braking operation. FIG. 7 is a map showing the relationship between the vehicle speed and the target seat height displacement amount correction coefficient. The seat height control amount setting part 12 may determine the target seat height displacement amount correction coefficient by using the map shown in FIG. 7 instead of the map shown in FIG. 4.

The target seat height displacement amount correction coefficient $\alpha$ may be determined according to the following expression (7) by referring to the map shown in FIG. 7.

$$\alpha = (\alpha_0 / V_{BO}) \cdot V_B \quad (7)$$

where $\alpha_0$ is the value obtained by the above-mentioned expression (2),
$V_{BO}$ is the braking initial speed, and
$V_B$ is the detected value of vehicle speed.

Thus, the target seat height displacement amount correction coefficient $\alpha$ may be determined each time according to the vehicle speed detected by the vehicle speed sensor 5 without using the braking initial speed. Determining the target seat height displacement amount correction coefficient $\alpha$ in this mode can also provide the driver with a natural feel of deceleration at the time when the vehicle M1 is decelerated. Setting the braking control amount by using "$V_B$" instead of "$V_{BO}$" in the above-mentioned expression (5) in this mode can provide the driver with a feel of deceleration proportional to the decelerating action.

Though the target seat height displacement amount obtained in step S5 of FIG. 2 is determined according to the deceleration of the vehicle M1 detected by the acceleration sensor 2, it may be determined according to the amount of operation of the brake pedal detected by the pedal stroke sensor 4. The target seat height displacement amount may also be determined according to an amount determined according to the deceleration of the vehicle M1 and the amount of operation of the brake pedal, such as the sum of the target seat height displacement amount determined from the deceleration of the vehicle M1 and the target seat height displacement amount determined from the amount of operation of the brake pedal.

Figure 8:
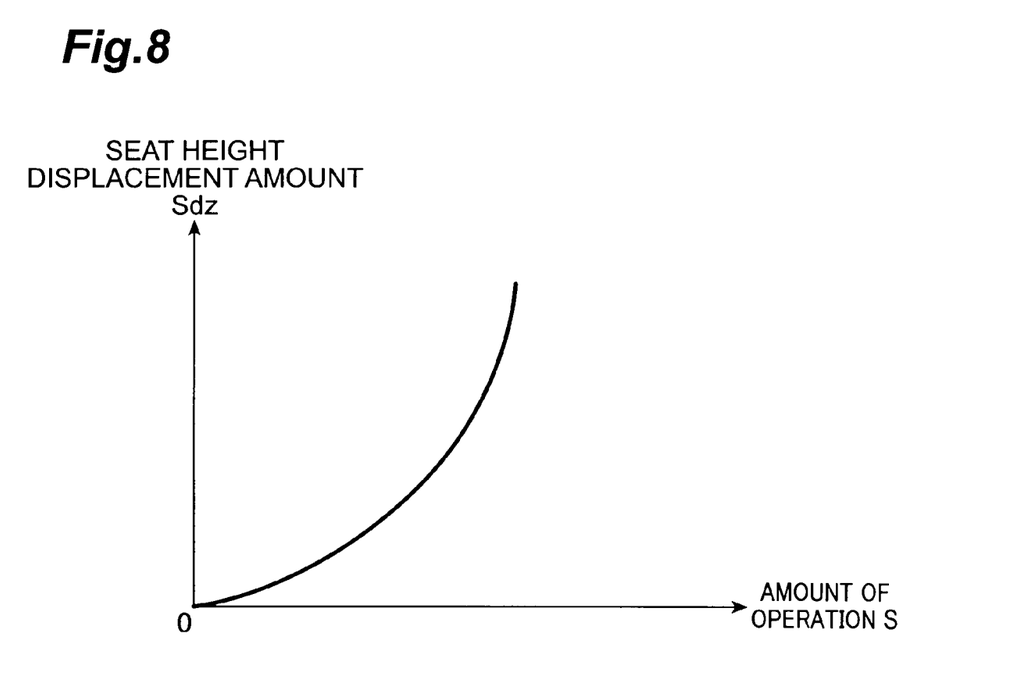
FIG. 8 is a map showing the relationship between the amount of operation of the brake pedal and a second target seat height displacement amount.

The following mode may be employed when determining the target seat height displacement amount from the sum of the target seat height displacement amount (first target seat height displacement amount) determined from the deceleration of the vehicle M1 and the target seat height displacement amount (second target seat height displacement amount) determined from the amount of operation of the brake pedal. FIG. 8 is a map indicating the relationship between the amount of operation of the brake pedal and the second target seat height displacement amount. When determining a ratio of a first target seat displacement amount Sdz1 set with respect to the deceleration of the vehicle M1, the seat height control amount setting part 12 determines it according to the speed of the vehicle M1 by referring to a map, which changes in response to the speed of the vehicle M1 as with the one shown in FIG. 3, for the deceleration as in the case of determining the target seat height displacement amount Sdz by using the above-mentioned expression (3). When determining a ratio of a second target seat height displacement amount Sdz2 set with respect to the amount of operation of the brake pedal, on the other hand, the second target seat height displacement amount Sdz2 is determined according to the following expression (8) with reference to the amount of operation S of the brake pedal in a map shown in FIG. 8.

$$Sdz2 = \beta Sb \quad (8)$$

where $\beta = (\beta_0/V_{BO}) \cdot V_B$, $\beta_0$ is a constant, and

S is the amount of operation of the brake pedal.

Then, the target seat height displacement amount Sdz is determined by the following expression (9):

$$Sdz = Sdz1 + Sdz2. \quad (9)$$

When the first target seat height displacement amount Sdz1 with respect to the deceleration of the vehicle is determined according to the vehicle speed of the vehicle M1 while the second target seat height displacement amount Sdz2 with respect to the amount of operation of the brake pedal is kept constant, the driver can be provided with a natural feel of deceleration.

Figure 9:
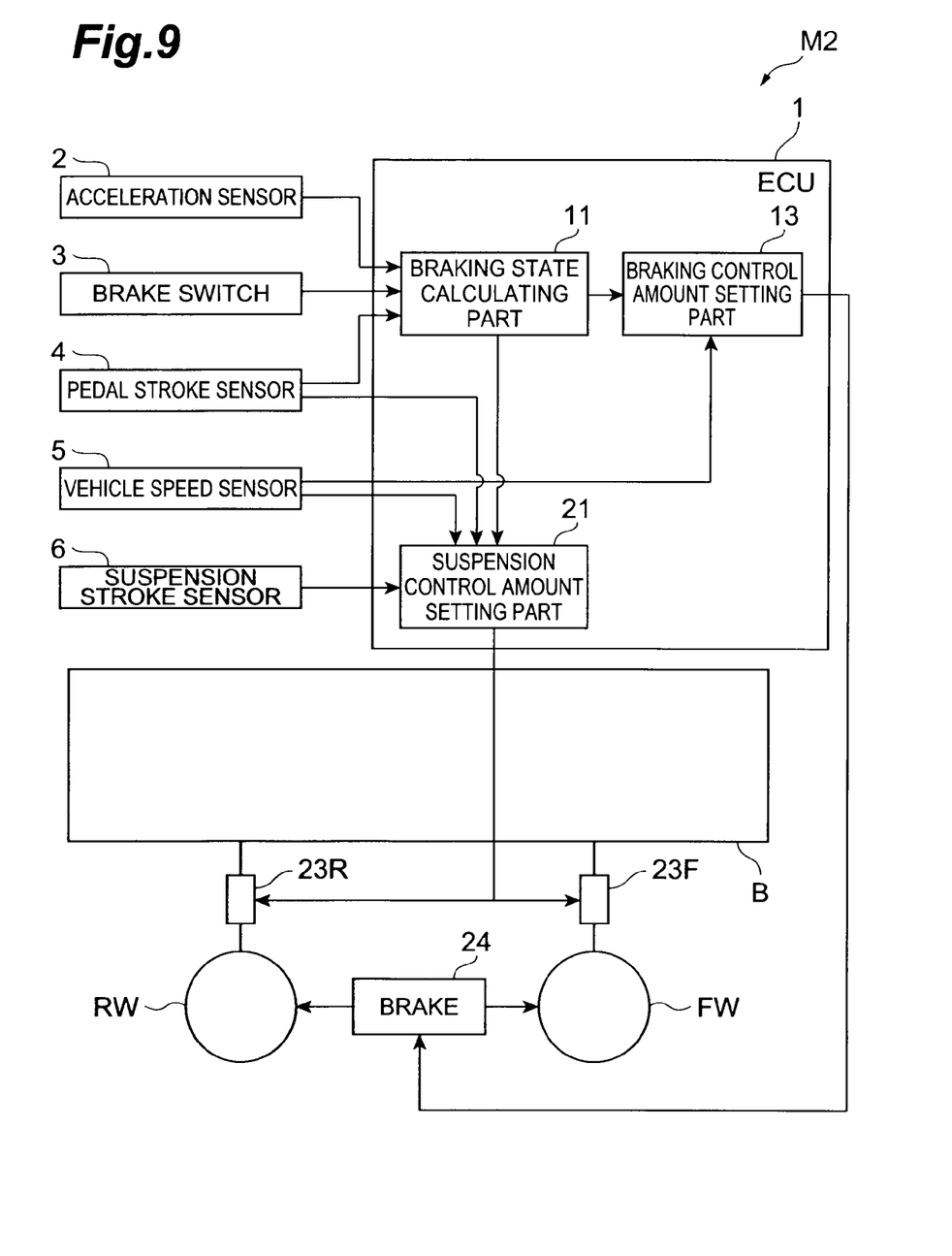
FIG. 9 is a block diagram showing the structure of a suspension control apparatus.

The second embodiment of the present invention will now be explained. FIG. 9 is a diagram showing the structure of a suspension control apparatus as the vehicle altitude control apparatus in accordance with this embodiment. This embodiment adjusts the altitude of the driver with respect to the road surface by suspension control which regulates the height of the suspension. As shown in FIG. 9, the suspension control apparatus in accordance with this embodiment is provided in a vehicle M2 and differs from the first embodiment in the following points. First, its ECU 20 includes a suspension control amount setting part 21 which is a vehicle height setting means in place of the seat height control amount setting part 12. It also includes a suspension stroke sensor 22 instead of the seat height sensor 6, while the suspension stroke sensor 22 is connected to the suspension control amount setting part 21.

The vehicle M2 further includes a vehicle body B, while a front suspension apparatus 23F and a rear suspension apparatus 23R, which are vehicle height adjusting means, are provided at front and rear positions of the vehicle body B, respectively. Further, a front wheel FW and a rear wheel RW are provided at front and rear positions of the vehicle body B, respectively, while a brake 24 is attached to the front and rear wheels FW, RW. The suspension control amount setting part 21 in the ECU 20 is connected to the suspension apparatus 23F, 23R, while the braking control amount setting part 13 in the ECU 20 is connected to the brake 24. The suspension apparatus 23F, 23R, which are equipped with respective suspension springs and respective hydraulic cylinders, adjust the vehicle height according to the expanding/contracting state of the hydraulic cylinders and absorb vibrations with the suspension springs. The front and rear suspension apparatus 23F, 23R also adjust the vehicle height of the vehicle body B by controlling their expanding/contracting state.

Except for these points, the suspension control apparatus in accordance with this embodiment has the same structure as that of the first embodiment mentioned above.

The suspension control apparatus in accordance with this embodiment having the foregoing structure reads the sensors and then determines a target vehicle height displacement amount by calculation as in the above-mentioned first embodiment. The target vehicle height displacement amount herein is determined by a way of thinking similar to that for determining the target seat height displacement amount in the above-mentioned first embodiment. Specifically, the target vehicle height displacement amount is determined such that the target vehicle height displacement amount increases as the deceleration is greater.

After determining the target vehicle height displacement amount, it is determined whether a brake ON signal is outputted or not. When the brake ON signal is outputted, a braking initial speed is specified, and the target vehicle height displacement amount is corrected according to the braking initial speed. Here, the target vehicle height displacement amount is made greater as the braking initial speed is higher.

Subsequently, a target deceleration is determined by calculation as in the above-mentioned first embodiment, and then the suspension apparatus 23F, 23R are expanded or contracted according to the corrected target vehicle height displacement amount, so as to adjust the vehicle height. Thereafter, brake control similar to that in the first embodiment is performed, whereby the suspension control is terminated.

Thus adjusting the vehicle height by the suspension apparatus 23F, 23R can also provide the driver with a natural feel of deceleration at the time when the vehicle M2 is decelerated.

Though preferred embodiments of the present invention are explained in the foregoing, the present invention is not limited to the above-mentioned embodiments. For example, for correcting the amount of displacement of the target altitude so as to make it greater as the braking initial speed is higher, the above-mentioned embodiments multiply the amount of displacement of the target altitude by a target seat height displacement amount correction coefficient, but a value computed according a predetermined coefficient may be subtracted therefrom. Though the first and second embodiments adjust the target altitude by adjusting the seat height and the vehicle height under suspension control, respectively, the adjustment of seat height and the adjustment of vehicle height under suspension control may be used together, so as to adjust the target altitude.

INDUSTRIAL APPLICABILITY

The present invention can be utilized in a vehicle altitude control apparatus which controls the altitude of a driver in a vehicle with respect to the road surface.

The invention claimed is:

1. A vehicle altitude control apparatus comprising:
    a braking state detecting unit for detecting a braking state of a vehicle;
    a target altitude setting unit for setting a target altitude of a driver with respect to a road surface according to the braking state detected by the braking state detecting unit;
    an altitude adjusting unit for adjusting an altitude of the driver according to the target altitude set by the target altitude setting unit; and
    a vehicle speed detecting unit for detecting a vehicle speed of the vehicle;
    wherein the target altitude setting unit corrects the target altitude according to the vehicle speed detected by the vehicle speed detecting unit.

2. A vehicle altitude control apparatus according to claim 1, wherein the target altitude setting unit corrects the target altitude so that the amount of downward displacement of the target altitude becomes greater as the vehicle speed detected by the vehicle speed detecting unit is higher.

3. A vehicle altitude control apparatus according to claim 1, further comprising:
    a braking unit for braking the vehicle and braking control unit for controlling the braking unit;
    wherein the braking control unit sets a greater amount of braking in the braking unit as the vehicle speed detected by the vehicle speed detecting unit is higher.

4. A vehicle altitude control apparatus according to claim 3, further comprising:
    a brake operating unit for operating the braking unit, the brake operating unit being operated by the driver,
    a braking operation amount detecting unit for detecting an amount of braking operation of the brake operating unit, and
    an acceleration detecting unit for detecting an acceleration of the vehicle;
    wherein the braking state detecting unit detects the braking state of the vehicle according to the amount of braking operation of the brake operating unit detected by the braking operation amount detecting unit and the acceleration of the vehicle detected by the acceleration detecting unit; and wherein the target altitude setting unit keeps a constant relationship between the altitude and the amount of operation of the brake operating unit and determines a ratio of the altitude set with respect to the acceleration of the vehicle according to the vehicle speed detected by the vehicle speed detecting unit.

5. A vehicle altitude control apparatus according to claim 1, wherein the target altitude is determined according to a seat height of a driver's seat in the vehicle; wherein the target altitude setting unit is a seat height setting unit for setting the seat height; and wherein the altitude adjusting unit is a seat height adjusting unit for adjusting the seat height.

6. A vehicle altitude control apparatus according to claim 1, wherein the target altitude is determined according to a vehicle height of the vehicle; wherein the target altitude setting unit is a vehicle height setting unit for setting the vehicle height; and wherein the altitude adjusting unit is a vehicle height adjusting unit for adjusting the vehicle height of the vehicle.

* * * * *